United States Patent

Kimura et al.

[11] Patent Number: 5,964,309
[45] Date of Patent: Oct. 12, 1999

[54] POWER SUPPLY SYSTEM, ELECTRIC VEHICLE WITH POWER SUPPLY SYSTEM MOUNTED THEREON, AND METHOD OF REGULATING AMOUNT OF FUEL SUPPLY

[75] Inventors: Yoshio Kimura, Okazaki; Yasuhiro Nonobe, Aichi-ken; Munehisa Horiguchi, Sapporo, all of Japan

[73] Assignees: Toyota Jidosha Kabushiki Kaisha, Toyota, Japan; Aisin Aw Co., Ltd., Anjo, Japan

[21] Appl. No.: 08/900,712

[22] Filed: Jul. 25, 1997

[30] Foreign Application Priority Data

Jul. 26, 1996 [JP] Japan ................................. 8-215285

[51] Int. Cl.$^6$ ..................................................... B60K 1/00
[52] U.S. Cl. ........................... 180/65.8; 180/65.2; 701/22
[58] Field of Search .................................. 180/65.2, 65.3, 180/65.4, 65.5, 65.8; 701/22

[56] References Cited

U.S. PATENT DOCUMENTS

| | | | |
|---|---|---|---|
| 4,931,947 | 6/1990 | Werth et al. | 180/65.8 |
| 4,961,151 | 10/1990 | Early et al. | 180/65.8 |
| 4,962,462 | 10/1990 | Fekete | 180/65.8 |
| 5,212,431 | 5/1993 | Origuchi et al. | 180/65.4 |
| 5,631,532 | 5/1997 | Azuma et al. | 180/65.3 |
| 5,808,448 | 9/1998 | Naito. | |
| 5,820,172 | 10/1998 | Brigham et al. . | |
| 5,847,520 | 12/1998 | Theurillat et al. . | |
| 5,858,568 | 1/1999 | Hsu et al. | 180/65.3 |

FOREIGN PATENT DOCUMENTS 47-32321 11/1972 Japan .
6-124720 5/1994 Japan .

Primary Examiner—Paul N. Dickson
Assistant Examiner—Lynda Jasmin
Attorney, Agent, or Firm—Oblon, Spivak, McClelland, Maier & Neustadt, P.C.

[57] ABSTRACT

A power supply system 10 with a stack of fuel cells 20 and a storage battery 30 includes a remaining charge monitor 42 for measuring the remaining charge of the storage battery 30. At the time of starting the power supply system 10, the remaining charge monitor 42 detects the remaining charge of the storage battery 30. The power supply system 10 estimates output electric current of the fuel cells 20 based on the observed remaining charge of the storage battery 30 and an amount of electric power required for auxiliary machinery 34, and supplies required amounts of gases to the fuel cells 20 based on the estimated output electric current.

6 Claims, 7 Drawing Sheets

POWER SUPPLY SYSTEM, ELECTRIC VEHICLE WITH POWER SUPPLY SYSTEM MOUNTED THEREON, AND METHOD OF REGULATING AMOUNT OF FUEL SUPPLY

BACKGROUND OF THE INVENTION

1. Field of the Invention

The present invention relates to a power supply system, an electric vehicle with the power supply system mounted thereon, and a method of regulating an amount of fuel supply. More particularly the present invention pertains to a technique of regulating an amount of fuel supply to fuel cells included in a power supply system with the fuel cells and a storage battery.

2. Description of the Prior Art

A proposed power supply system includes fuel cells and storage batteries as power sources, wherein the fuel cells charge the storage batteries and the storage batteries charged to a sufficient level supply electric power to a loading (for example, JAPANESE PATENT LAYING-OPEN GAZETTE No. 6-124720). This power supply system includes a plurality of storage batteries, one of which is connected to the loading while the other is connected to the fuel cells. The storage battery having a less remaining charge is charged by the fuel cells, while the other storage battery supplies electric power to the loading. This structure ensures the sufficient charge state of the storage battery connected to the loading, thereby stably supplying electric power to the loading, such as a driving motor of the electric vehicle.

Since the proposed power supply system has a plurality of storage batteries, however, a relatively large space is required for installation of the power supply system. Especially when the power supply system is mounted on a vehicle as a power source of a motor for driving the vehicle, the relatively bulky power supply system in the restricted space of the vehicle undesirably reduces the degree of freedom in design of the vehicle. Only one storage battery is connected to the loading at one time. Each of the storage batteries is thus required to have a marginal capacity, in order to ensure sufficient outputs in case of an abrupt increase in loading, for example, at the time of starting the vehicle or going up a slope. The increase in capacity of the storage battery, however, results in increasing the weight. In some cases, it is accordingly impossible to mount a plurality of storage batteries having a sufficient capacity on the vehicle.

An improved structure has been proposed to reduce the size of the conventional power supply system that has a plurality of storage batteries and enables the storage batteries to be switched and alternately supply electric power to the loading. This improved structure has fuel cells and a storage battery, which are connected in parallel and enables at least either one of the fuel cells and the storage battery to supply electric power to the loading. In case that the loading is smaller than a predetermined level and the fuel cells have a marginal output, the fuel cells can charge the storage battery while driving the loading. In case that the loading is greater than a predetermined level, on the other hand, both the fuel cells and the storage battery work to drive the loading. This structure decreases the required capacity of the storage battery, thereby reducing the size of the power supply system.

In the power supply system of this structure that enables reduction in size, however, the charging condition of the storage battery may cause shortage of gases supplied to the fuel cells, which lead to various troubles. In case that the storage battery is in the insufficient charge state, the fuel cells are expected to charge the storage battery while driving the loading. When the sufficient amounts of gases corresponding to the output from the fuel cells to the storage battery are not fed to the fuel cells, some problems arise in the process of power generation in the fuel cells.

In case that the amounts of gases supplied to the fuel cells are insufficient for the required output of the fuel cells, a voltage drop, for example, may occur in the fuel cells to damage their function as the power source. In case that the amounts of gases supplied to the fuel cells are insufficient for the amount of the connected loading, this causes a voltage drop as well as uneven power generation in the respective unit cells constituting the stack of fuel cells, which results in an abnormal phenomenon, such as a change of poles in part of the unit cells. The change of poles is a phenomenon that reverses the anode and cathode in the cell reactions. Such an abnormal phenomenon makes the voltage unstable and causes energy that has not been converted to electrical energy to be released as thermal energy and partially increase the temperature of the fuel cells. The partial temperature increase damages the elements of the fuel cells and shortens the life of the fuel cells.

Possible shortage of gases in the fuel cells due to the insufficient charge state of the storage battery is a significant problem especially at the time of starting the power supply system. It is assumed that the power supply system stops operation while the storage battery has an insufficient remaining charge. At the time of a next start of the power supply system, the fuel cells are required to start a supply of electric power to the storage battery simultaneously with a start of warm-up. Supply of only the required amounts of gases for the warm-up operation causes shortage of gases in the fuel cells.

SUMMARY OF THE INVENTION

One object of the present invention is thus to prevent shortage of gases supplied to fuel cells, which may cause troubles, such as a voltage drop and a partial heat emission.

Another object of the present invention is to provide a power supply system, an electric vehicle with such a power supply system, and a method of regulating an amount of fuel supply, which attain the above object.

At least part of the above and the other related objects is realized by a first power supply system having a stack of fuel cells and a storage battery, which are connected parallel to each other and also to a loading, wherein the stack of fuel cells and the storage battery supply electric power to the loading. The first power supply system includes: remaining charge detection means for detecting a remaining charge of the storage battery; amount-of-loading detection means for detecting a total amount of the loading; charge-discharge state estimation means for estimating a charge-discharge state of the storage battery, based on the results of detection by the remaining charge detection means and the amount-of-loading detection means; amount-of-fuel supply determination means for determining a required amount of a fuel for power generation in the stack of fuel cells, based on the charge-discharge state of the storage battery estimated by the charge-discharge state estimation means; and fuel supply means for supplying the required amount of the fuel determined by the amount-of-fuel supply determination means to the stack of fuel cells.

The first power supply system of the present invention determines the required amount of a fuel based on the estimated charge-discharge state of the storage battery and supplies the required amount of the fuel to the fuel cells. This structure effectively prevents shortage of the fuel in the fuel cells, which may cause troubles, such as a voltage drop and a partial heat emission. In case that the amount of the fuel supplied to the fuel cells corresponds to only the amount of the connected loading, there is a fear of shortage of the fuel in the fuel cells, which charge the storage battery. The structure of the invention, however, determines the required amount of the fuel for the fuel cells by taking into account the charge state of the storage battery, thereby enabling the sufficient amount of the fuel to be supplied to the fuel cells, which can accordingly output the electric power to both the loading and the storage battery.

The first power supply system determines the amount of the fuel, which the fuel cells require to output a predetermined amount of electric power, based on the amount of the connected loading and the charge-discharge state of the storage battery. This structure effectively prevents excess amounts of gases from being wastefully supplied to the fuel cells. When the storage battery is in the discharging condition, the amount of electric power which the fuel cells should supply to the loading becomes smaller than the amount of the loading. In this case, the structure of the present invention determines the amount of the fuel to be supplied to the fuel cells by taking into account the discharge state of the storage battery, thereby reducing the excess amount of the fuel wastefully supplied to the fuel cells.

The fuel required for power generation in the fuel cells represents gases (or liquids in some cases) supplied to the cathodes and the anodes of the fuel cells for the electrochemical reactions proceeding in the fuel cells. Concrete examples of gases include a gaseous fuel supplied to the cathodes of the fuel cells and an oxidizing gas supplied to the anodes of the fuel cells. The gaseous fuel may be gaseous hydrogen of high purity or a hydrogen-rich gas obtained by reforming a crude fuel of hydrocarbons. The oxidizing gas may be the air. The structure of the present invention does not waste the fuel supplied to the fuel cells, thus preventing the gaseous fuel (or the crude fuel for producing the gaseous fuel) from being wastefully supplied to the fuel cells or the electric power from being wastefully consumed by an air compressor that supplies the pressurized air to the fuel cells.

The above and the other related objects may also be realized by a second power supply system having a stack of fuel cells and a storage battery, which are connected parallel to each other and also to a loading, wherein the stack of fuel cells and the storage battery supply electric power to the loading. The second power supply system includes: remaining charge detection means for detecting a remaining charge of the storage battery; charge-discharge state estimation means for, at the time of starting the power supply system, estimating a charge-discharge state of the storage battery, based on a predetermined amount of loading, which represents electric power consumed by machinery driven at the time of starting the power supply system, out of the loading and the result of detection by the remaining charge detection means; amount-of-fuel supply determination means for, at least when the storage battery is in a charging condition, determining a required amount of a fuel for power generation in the stack of fuel cells, based on the charge-discharge state of the storage battery estimated by the charge-discharge state estimation means; and fuel supply means for supplying the required amount of the fuel determined by the amount-of-fuel supply determination means to the stack of fuel cells.

The second power supply system of the present invention estimates the charge-discharge state of the storage battery, and determines the amount of the fuel supplied to the fuel cells at the time of starting the power supply system, based on the estimated charge-discharge state of the storage battery. This structure effectively prevents shortage of the fuel in the fuel cells, which may cause troubles, such as a voltage drop and a partial heat emission, at the time of starting the power supply system.

The present invention is also directed to an electric vehicle having a motor rotated by electrical energy and means for transmitting a rotational force of the motor to an axle, thereby producing a driving force for the vehicle. The electric vehicle has either the first power supply system or the second power supply system mounted thereon, and the motor is driven by a supply of electric power from the adopted power supply system.

In a power supply system having a stack of fuel cells and a storage battery, which are connected parallel to each other and also to a loading, wherein the stack of fuel cells and the storage battery supply electric power to the loading, the present invention is also directed to a first method of regulating an amount of a fuel supplied to the stack of fuel cells for power generation in the stack of fuel cells. The first method includes the steps of:

(a) detecting a remaining charge of the storage battery;
(b) detecting a total amount of the loading;
(c) estimating a charge-discharge state of the storage battery, based on the remaining charge detected in the step (a) and the total amount of the loading detected in the step (b);
(d) determining a required amount of the fuel for power generation in the stack of fuel cells, based on the charge-discharge state of the storage battery estimated in the step (c); and
(e) supplying the required amount of the fuel determined in the step (d) to the stack of fuel cells.

In a power supply system having a stack of fuel cells and a storage battery, which are connected parallel to each other and also to a loading, wherein the stack of fuel cells and the storage battery supply electric power to the loading, the present invention is further directed to a second method of regulating an amount of a fuel supplied to the stack of fuel cells for power generation in the stack of fuel cells. The second method includes the steps of:

(a) detecting a remaining charge of the storage battery;
(b) at the time of starting the power supply system, estimating a charge-discharge state of the storage battery, based on a predetermined amount of loading, which represents electric power consumed by machinery driven at the time of starting the power supply system, out of the loading and the remaining charge detected in the step (a);
(c) at least when the storage battery is in a charging condition, determining a required amount of the fuel for power generation in the stack of fuel cells, based on the charge-discharge state of the storage battery estimated in the step (b); and
(d) supplying the required amount of the fuel determined in the step (c) to the stack of fuel cells.

These and other objects, features, aspects, and advantages of the present invention will become more apparent from the following detailed description of the preferred embodiments with the accompanying drawings.

DESCRIPTION OF THE PREFERRED EMBODIMENTS

Figure 1:
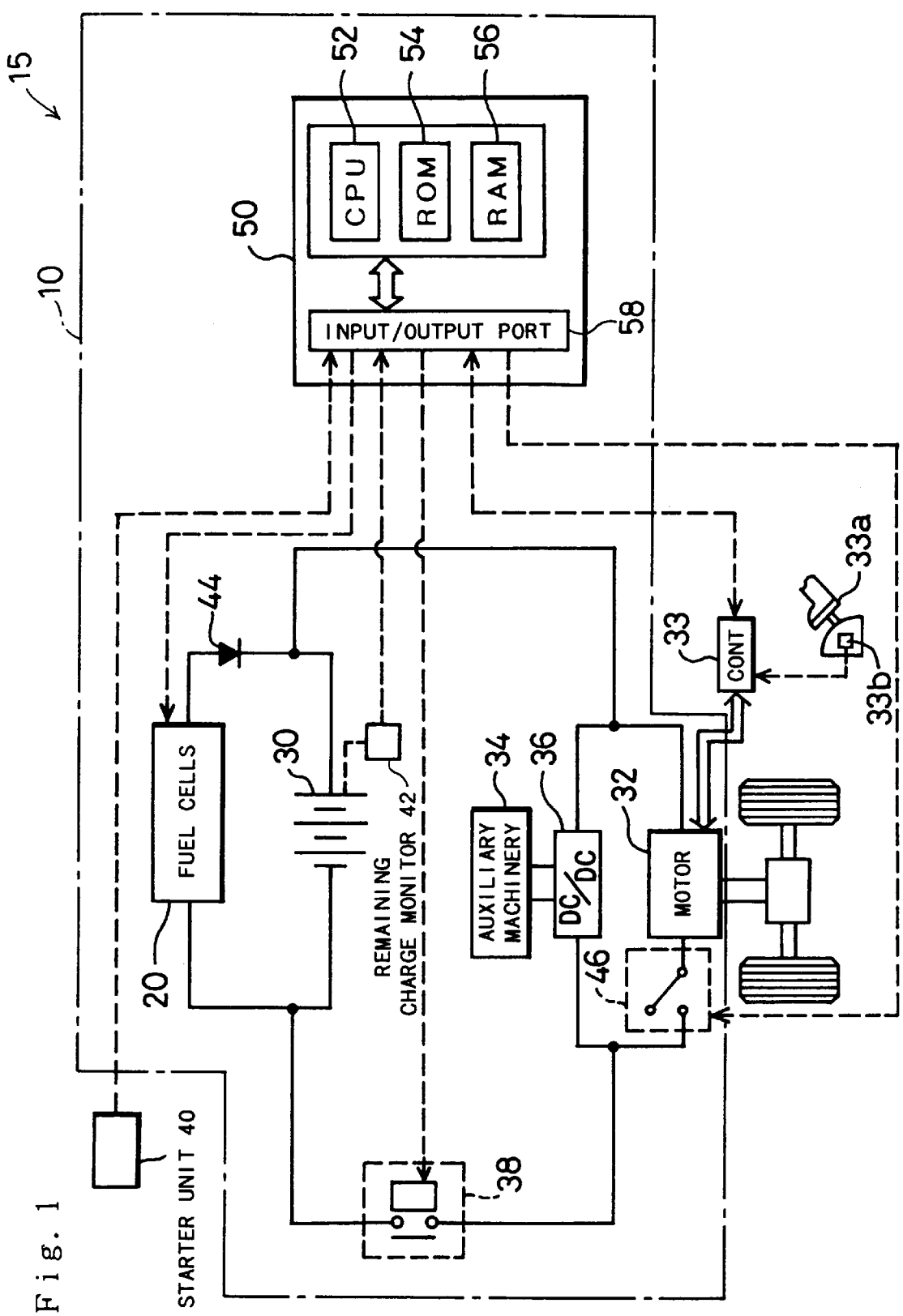
FIG. 1 is a block diagram illustrating structure of an electric vehicle 15 with a power supply system 10 as a first embodiment according to the present invention.

Some modes of carrying out the present invention are described as preferred embodiments, in order to further clarify the structures and functions of the present invention. FIG. 1 is a block diagram schematically illustrating structure of an electric vehicle 15 with a power supply system 10 as a first embodiment according to the present invention. The power supply system 10 of the embodiment mounted on the electric vehicle 15 works as a power source for driving the vehicle 15. The power supply system 10 primarily includes fuel cells 20, a storage battery 30, a motor 32 for driving the vehicle, auxiliary machinery 34, a DC/DC converter 36, a first relay 38, a starter unit 40, a remaining charge monitor 42, a second relay 46, and a control unit 50. The following describes the constituents related to the power supply system 10 included in the electric vehicle 15.

The fuel cells 20 are polymer electrolyte fuel cells, which are constructed as a stack of plural unit cells 28. The fuel cells 20 receive a supply of hydrogen-containing gaseous fuel on the side of cathodes and a supply of oxygen-containing oxidizing gas on the side of anodes and generate an electromotive force through the electrochemical reactions shown below:

Figure 2:
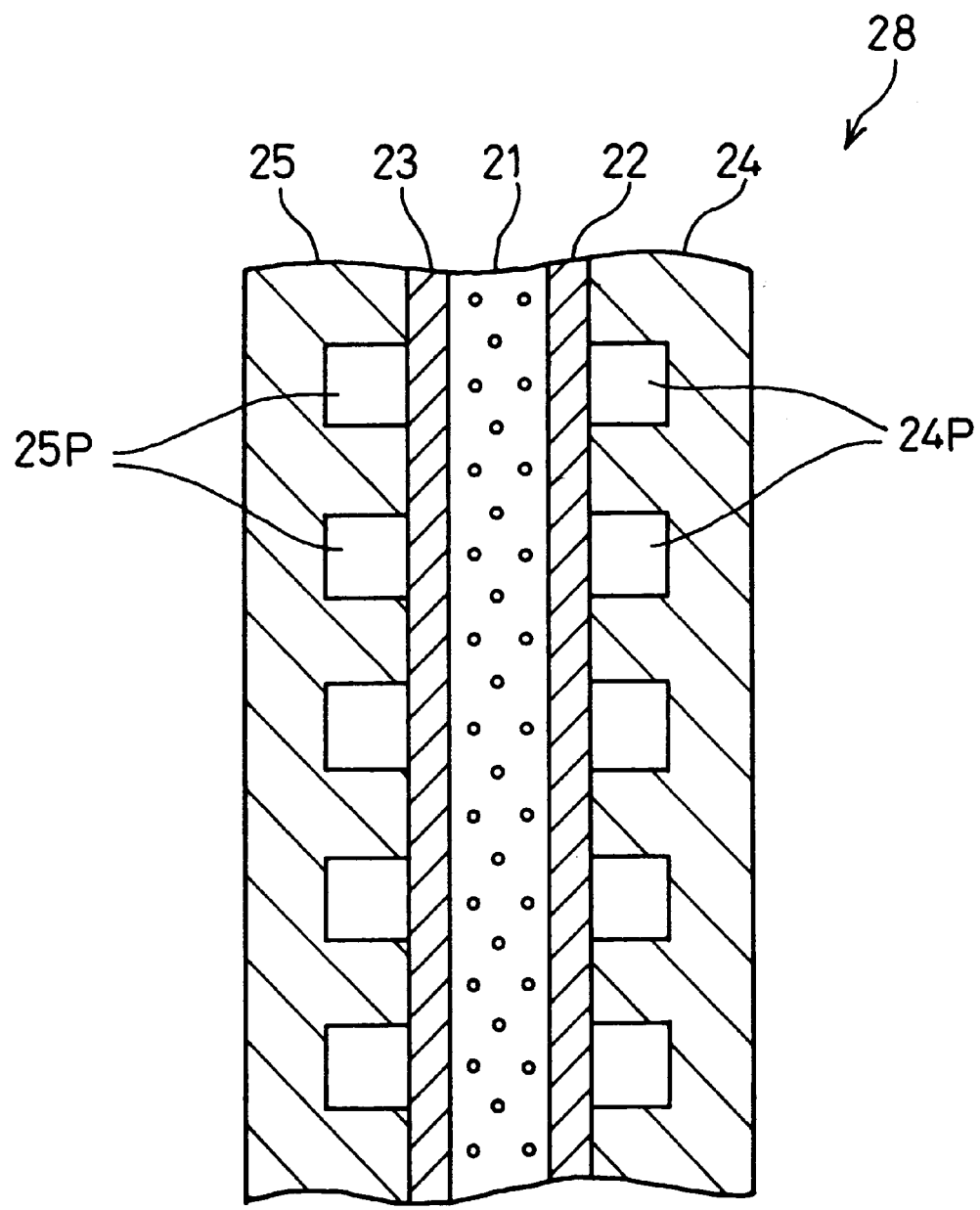
FIG. 2 is a cross sectional view schematically illustrating structure of a unit cell 28 in fuel cells 20.

Equations (1), (2), and (3) respectively denote a reaction occurring at the cathodes, a reaction occurring at the anodes, and a total reaction occurring in the whole fuel cells 20. FIG. 2 is a cross sectional view illustrating structure of each unit cell 28 in the stack of fuel cells 20. The unit cell 28 includes an electrolyte membrane 21, an anode 22, a cathode 23, and separators 24 and 25.

The anode 22 and the cathode 23 are gas diffusion electrodes arranged across the electrolyte membrane 21 to construct a sandwich-like structure. The separators 24 and 25 are disposed outside the sandwich-like structure and respectively connected to the anode 22 and the cathode 23 to form flow paths of gaseous fuel and oxidizing gas. Flow paths 24P of gaseous fuel are defined by the anode 22 and the separator 24, whereas flow paths 25P of oxidizing gas are defined by the cathode 23 and the separator 25. Although the separators 24 and 25 respectively form the flow paths on their single side faces in the drawing of FIG. 2, ribs are formed on either side faces of each separator in the actual state. Namely one side face of each separator combined with the anode 22 forms the flow paths 24P of gaseous fuel, while the other side face combined with the cathode 23 of an adjoining unit cell forms the flow paths 25P of oxidizing gas. In this manner, the separators 24 and 25 are joined with the gas diffusion electrodes to define gas flow paths and separate the flow of gaseous fuel from the flow of oxidizing gas between the adjoining unit cells. In the process of laying a number of unit cells 28 one upon another to form a stack structure, the two separators located on both ends of the stack structure may have ribs only on their single side faces coming into contact with the gas diffusion electrodes.

The electrolyte membrane 21 is a proton-conductive ion-exchange membrane composed of a polymer material, such as fluororesin, and shows favorable electrical conductivity in the wet state. In this embodiment, a Nafion membrane (manufactured by du Pont) is applied for the electrolyte membrane 21. The surface of the electrolyte membrane 21 is coated with platinum or a platinum-containing alloy functioning as a catalyst. The technique adopted in this embodiment to apply the catalyst prepares carbon powder with platinum or a platinum-containing alloy carried thereon, disperses the catalyst-carried carbon powder into an appropriate organic solvent, adds a specific amount of an electrolyte solution (for example, Nafion solution manufactured by Aldrich Chemical Corp.) to the dispersion to form a paste, and screen-prints the paste on the electrolyte membrane 21. Another available technique forms the paste containing the catalyst-carried carbon powder to a sheet and presses the sheet onto the electrolyte membrane 21. Although the platinum-containing catalyst is applied on the electrolyte membrane 21 in this embodiment, the catalyst may be applied on the anode 22 and the cathode 23, which are in contact with the electrolyte membrane 21.

The anode 22 and the cathode 23 are made of carbon cloth, which is woven of yarns consisting of carbon fibers. Although the anode 22 and the cathode 23 are composed of carbon cloth in this embodiment, carbon paper or carbon felt consisting of carbon fibers are also favorably applicable for the material of the anode 22 and the cathode 23.

The separators 24 and 25 are made of a gas-impermeable conductive material, for example, gas-impermeable, dense carbon obtained by compressing carbon. Each of the separators 24 and 25 has a plurality of ribs arranged in parallel and formed on both side faces thereof. As discussed previously, each separator is combined with the surface of the anode 22 to define the flow paths 24P of gaseous fuel and with the surface of the cathode 23 of the adjoining unit cell to define the flow paths 25P of oxidizing gas. In accordance with another possible structure, the ribs formed on one side face of each separator may be arranged perpendicular to or at a certain angle with those formed on the other side face of the separator. As long as the gaseous fuel and the oxidizing gas can be supplied to the gas diffusion electrodes, the ribs may not be formed as parallel grooves.

As discussed above, each unit cell 28, which is the fundamental structure of the fuel cells 20, has the separator 24, the anode 22, the electrolyte membrane 21, the cathode 23, and the separator 25, which are arranged in this sequence. The stack of fuel cells 20 is obtained by stacking plural sets of such unit cells 28 (100 sets in this embodiment) and setting current collector plates (not shown), which are made of dense carbon or copper plates, on both ends of the stack structure.

Figure 3:
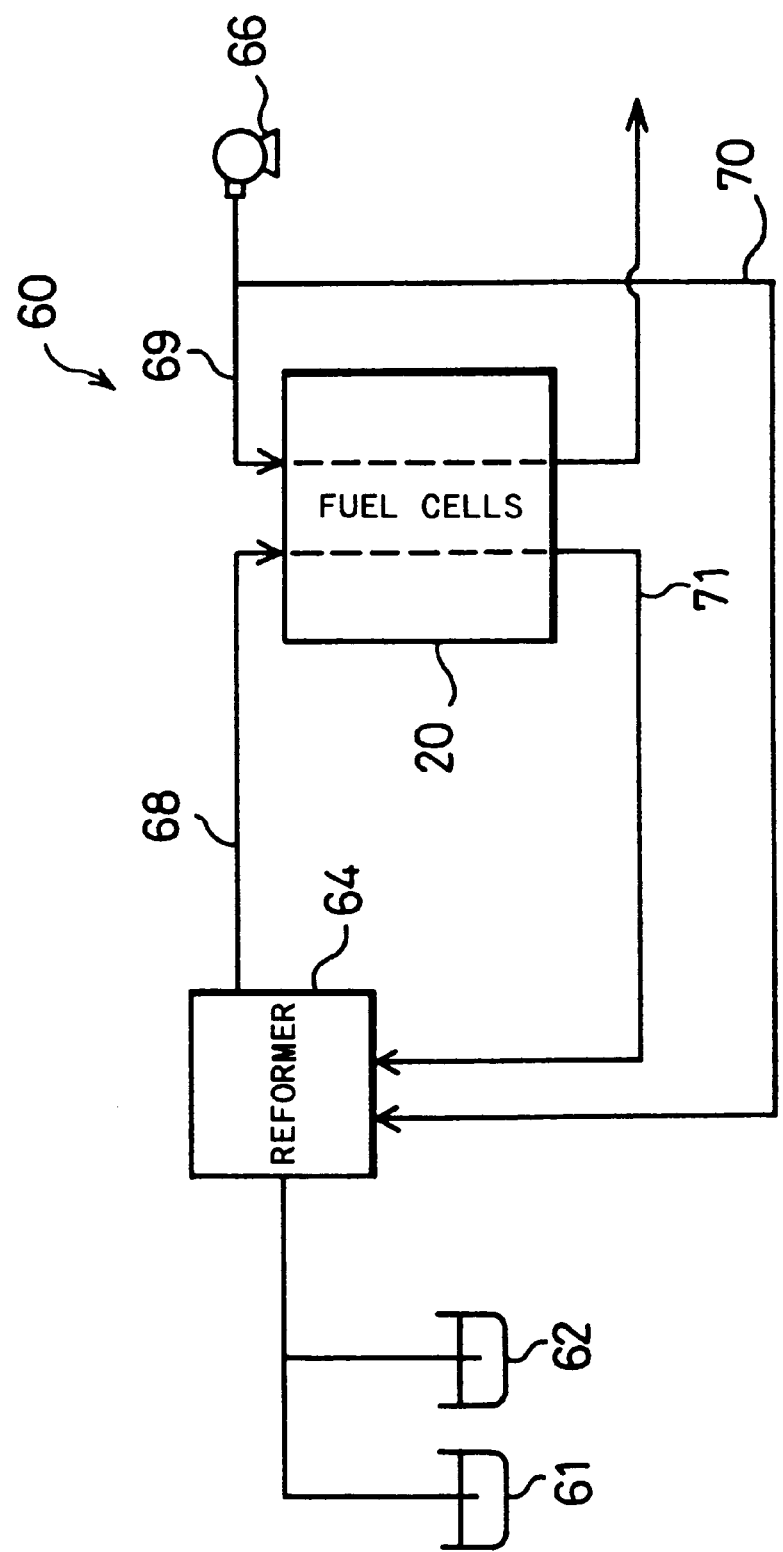
FIG. 3 is a block diagram illustrating structure of a fuel-cells unit 60.

Although being omitted from the illustration in the block diagram of FIG. 1, predetermined peripheral devices other than the fuel cells of the stack structure are required to generate electricity by means of the fuel cells. FIG. 3 is a block diagram illustrating structure of a fuel-cells unit 60 including the stack of fuel cells 20 and peripheral devices. The fuel-cells unit 60 primarily includes the stack of fuel cells 20, a methanol tank 61, a water tank 62, a reformer 64, and an air compressor 66.

The reformer 64 receives supplies of methanol and water from the methanol tank 61 and the water tank 62, respectively. The reformer 64 reforms the supply of methanol, which has been fed as a crude fuel, by steam reforming to produce a hydrogen-rich gaseous fuel. A reforming reaction expressed by the following equations occurs in the reformer 64:

$$CH_3OH \rightarrow CO + 2H_2 \qquad (4)$$

$$CO + H_2O \rightarrow CO_2 + H_2 \qquad (5)$$

$$CH_3OH + H_2O \rightarrow CO_2 + 3H_2 \qquad (6)$$

The decomposing reaction of methanol expressed by Equation (4) proceeds simultaneously with the reforming reaction of carbon monoxide expressed by Equation (5), so that the reaction of Equation (6) occurs as the overall reforming reaction of methanol in the reformer 64. This reforming reaction is endothermic as a whole. A hydrogen-rich gaseous fuel produced by the reformer 64 is fed to the stack of fuel cells 20 via a fuel supply conduit 68, led into the flow paths 24P of gaseous fuel in the respective unit cells 28 included in the stack of fuel cells 20, and subjected to the cell reaction at the anodes 22. The reaction occurring at the anodes 22 is expressed by Equation (1) given above. With a view to supplying a required amount of water and preventing the electrolyte membrane 21 from being dried, a humidifier may be disposed in the fuel supply conduit 68. In this structure, the humidified gaseous fuel is supplied to the fuel cells 20.

The air compressor 66 takes in and pressurizes the air and feeds a supply of the pressurized air to the fuel cells 20. The air taken in and pressurized by the air compressor 66 is fed to the fuel cells 20 via an air supply conduit 69, led into the flow paths 25P of oxidizing gas in the respective unit cells 28 included in the stack of fuel cells 20, and subjected to the cell reaction at the cathodes 23. In the fuel cells, the velocity of reaction increases generally with an increase in pressure of the gases supplied to both the anodes and the cathodes. This improves the performance of the fuel cells. This is why the air fed to the cathodes 23 is pressurized by the air compressor 66. The pressure of the gaseous fuel fed to the anodes 22 can be regulated readily by controlling the on-off state of a solenoid-operated valve of a mass flow controller (not shown) disposed in the fuel supply conduit 68.

The exhaust of gaseous fuel after the cell reaction at the anodes 22 in the fuel cells 20 and part of the air compressed by the air compressor 66 are fed to the reformer 64. As mentioned previously, the overall reforming reaction occurring in the reformer 64 is endothermic and requires an external supply of heat. A burner (not shown) for heating is thus disposed in the reformer 64. The exhaust of gaseous fuel and the compressed air are used for combustion of the burner. The exhaust of gaseous fuel discharged from the cathodes 23 of the fuel cells 20 are led into the reformer 64 via a fuel exhaust conduit 71, whereas the compressed air is led to the reformer 64 via an air path branch 70 branching off from the air supply conduit 69. Hydrogen remaining in the exhaust of gaseous fuel and oxygen in the compressed air are used for combustion of the burner, in order to supply a required amount of heat for the reforming reaction.

Output of the fuel cells 20 of the embodiment is controlled by regulating the flows of gaseous fuel and oxidizing gas supplied to the fuel cells 20 according to the amount of a connected loading. The control of the output is carried out by the control unit 50. The control unit 50 outputs driving signals to the air compressor 66 connecting with the air supply conduit 69 and the mass flow controller disposed in the fuel supply conduit 68, in order to adjust the driving amount and the on/off state thereof. Such adjustment regulates the flows of gases supplied to the fuel cells 20, thereby ensuring the output of the fuel cells 20 according to the amount of the loading. Although output signals of the control unit 50 are input into the fuel cells 20 in the drawing of FIG. 1, these output signals are actually input into the above elements of the fuel-cells unit 60 relating to the regulation of the gas flows.

The storage battery 30 works together with the fuel cells 20 as a power source to supply the motor 32 and the auxiliary machinery 34 with the electric power. The storage battery 30 is a lead-acid accumulator in this embodiment, although other secondary batteries, such as a nickel-cadmium accumulator, a nickel-hydrogen accumulator, and a lithium secondary battery, are also applicable. The capacity of the storage battery 30 is determined according to the expected driving state of the electric vehicle 15 with the power supply system 10 mounted thereon, that is, the amount of the expected loading and the capacity of the fuel cells 20 arranged parallel to the storage battery 30.

The motor 32 receives a supply of electric power from the fuel cells 20 and the storage battery 30 and produces a rotating driving force. The rotating driving force is transmitted to front wheels and/or rear wheels via an axle of the vehicle with the power supply system 10 mounted thereon and functions as a power to drive the vehicle. The motor 32 is controlled by a controller 33. The controller 33 is also connected to an accelerator pedal position sensor 33b for detecting a step-on amount of an accelerator pedal 33a. The controller 33 is further connected to the control unit 50 and transmits various pieces of information, for example, regarding the operation of the motor 32, to and from the control unit 50.

The auxiliary machinery 34 is a loading that consumes electric power in a predetermined range during the operation of the power supply system 10. The auxiliary machinery 34 includes, for example, the air compressor 66, the mass flow controller, and a water pump. The air compressor 66 regulates the pressure of oxidizing gas fed to the fuel cells 20 as mentioned above. The water pump circulates the cooling water under pressure through the fuel cells 20. Circulation of the cooling water leads to heat exchange in the fuel cells 20, thereby keeping the internal temperature of the fuel cells 20 at a predetermined or lower level. The mass flow controller regulates the pressure and flow of the gaseous fuel fed to the fuel cells 20 as mentioned above. Although the fuel cells 20 and the auxiliary machinery 34 are illustrated independently in the block diagram of FIG. 1, the devices relating to the control of the operating state of the fuel cells 20 can be regarded as peripheral devices of the fuel cells 20. The auxiliary machinery 34 also includes interior elements that are not related to operation of the fuel cells 20, for example, a room light, a radio, and an air conditioner. The power consumption of such auxiliary machinery 34 is 5 kw at the maximum, which is significantly smaller than the power consumption of the motor 32 and has little variation.

The DC/DC converter 36 converts the output voltages of the fuel cells 20 and the storage battery 30 and applies the converted voltages to the auxiliary machinery 34. The voltage required for driving the motor 32 is generally 200 V to 300 V, and the corresponding voltage is output from the fuel cells 20 and the storage battery 30. On the other hand, the voltage required for driving the auxiliary machinery 34, such as the water pump, is only approximately 12 V. It is accordingly impossible to directly apply the voltages output from the fuel cells 20 and the storage battery 30. The DC/DC converter 36 thus lowers the voltages.

The driver of the vehicle with the power supply system 10 mounted thereon operates the starter unit 40 to start or stop the power supply system 10. The starter unit 40 is constructed, for example, as a predetermined start switch disposed in the vicinity of the driver's seat in the vehicle.

The first relay 38 is arranged at a predetermined position in the circuit constituting the power supply system 10 and has a contact to open and close the circuit. The relay 38 is connected to the control unit 50. When the driver gives an instruction to start the power supply system 10 via the starter unit 40, the control unit 50 causes the relay 38 to make a connection in the circuit that connects the fuel cells 20 and the storage battery 30 with the motor 32 and the auxiliary machinery 34. When the driver gives an instruction to stop the power supply system 10 via the starter unit 40, on the other hand, the control unit 50 causes the relay 38 to brake the connection in the circuit.

The remaining charge monitor 42 measures the remaining charge of the storage battery 30 and is realized by an SOC meter in this embodiment. The SOC meter accumulates the values of electric current and time of charge and discharge in the storage battery 30, and the control unit 50 calculates the remaining charge of the storage battery 30 based on the accumulated values. The remaining charge monitor 42 may be realized by a voltage sensor, instead of the SOC meter. The storage battery 30 lowers the voltage with a decrease in remaining charge. The voltage sensor takes advantage of this characteristic and measures the voltage, in order to detect the remaining charge of the storage battery 30. The voltage sensor is connected to the control unit 50. The relationship between the voltage measured by the voltage sensor and the remaining charge is stored in advance in the control unit 50. The control unit 50 thus determines the remaining charge of the storage battery 30 based on the measurements input from the voltage sensor. As another example, the remaining charge monitor 42 may be a device for measuring the specific gravity of an electrolytic solution in the storage battery 30 to detect the remaining charge.

The second relay 46 is disposed in the circuit that connects the motor 32 and the auxiliary machinery 34 parallel to the fuel cells 20 and the storage battery 30 and has a contact to close and open the circuit, so as to connect and disconnect the motor 32 with and from the fuel cells 20 and the storage battery 30. The control unit 50 controls the connection of the relay 46. The relay 46 is set in the off position while the power supply system 10 is at a stop. At a start of the power supply system 10, the electric power output from the fuel cells 20 and the storage battery 30 is accordingly not supplied to the motor 32 while being fed to the auxiliary machinery 34. The relay 46 is set in the on position when the motor 32 can be driven smoothly after a start of the power supply system 10, that is, when the warm-up of the fuel cells 20 has been completed or when the storage battery 30 has reached a predetermined charge state.

The control unit 50 is constructed as an arithmetic and logic circuit including a microcomputer, and has a CPU 52, a ROM 54, a RAM 56, and an input/output port 58. The CPU 52 carries out a variety of arithmetic operations according to preset control programs. Control programs and control data required for the variety of arithmetic operations executed by the CPU 52 are stored in advance in the ROM 54. Various data required for the arithmetic operations executed by the CPU 52 are temporarily written in and read from the RAM 56. The input/output port 58 receives detection signals from a variety of sensors, such as the remaining charge monitor 42, and outputs driving signals to the various actuators including the relay 46 according to the results of arithmetic operations by the CPU 52, thereby controlling the driving state of the respective elements of the power supply system 10.

Referring to FIG. 1, signals transmitted between the control unit 50 and the fuel cells 20 represent the control regarding the driving state of the fuel cells 20 or more precisely the control relating to operations of the respective constituents of the fuel-cells unit 60. As mentioned previously, the other control operations executed by the control unit 50 include output of driving signals to the air compressor 66 and the mass flow controller to regulate the flows of oxidizing gas and gaseous fuel, regulation of the amounts of methanol and water supplied to the reformer 64, and temperature control of the fuel cells 20 and the reformer 64.

A diode 44 is disposed in the circuit that connects the fuel cells 20 and the storage battery 30 parallel to each other and prevents the electric current from reversely flowing into the fuel cells 20. As discussed later, charge and discharge of the storage battery 30 depend upon the charge state thereof and the amount of the connected loading. According to these conditions, the storage battery 30 may supply the electric power to the loading or may be charged by the fuel cells 20. The fuel cells 20, on the other hand, only supply the loading with the electric power corresponding to the amount of the connected loading and the flows of supplied gases, and do not have the function of storing electricity. The diode 44 prevents a reverse flow of electric current, which causes troubles in cell reactions.

The power supply system 10 thus constructed works in the manner discussed below. The following describes the outputs from the fuel cells 20 and the storage battery 30 at a start of the power supply system 10. When the driver turns on a predetermined start switch included in the starter unit 40 of the power supply system 10, the control unit 50 outputs a driving signal to drive the relay 38 and connect the contact of the relay 38, thus starting warm-up of the fuel cells 20 while starting charge or discharge of the storage battery 30.

At the time of starting the power supply system 10, the fuel cells 20 have not yet reached a predetermined operating temperature and can thus not supply sufficient electric power to drive the motor 32. In this embodiment, at a start of the power supply system 10, the fuel cells 20 outputs the electric power only to the auxiliary machinery 34, which represents the loading of the amount in a predetermined range, for warm-up. When the fuel cells 20 in the insufficient warm-up state are exposed to the large loading, an excess flow of electric current may cause a voltage drop or other troubles. The structure of the embodiment enables the fuel cells 20 to start the warm-up operation and supply the electric current of the intensity within a predetermined range. The fuel cells 20 reach the stationary state through this warm-up operation. After the fuel cells 20 reach the stationary state, the contact of the relay 46 is turned on to make a connection, which enables the fuel cells 20 to start a supply of electric power to the motor 32.

Figure 4:
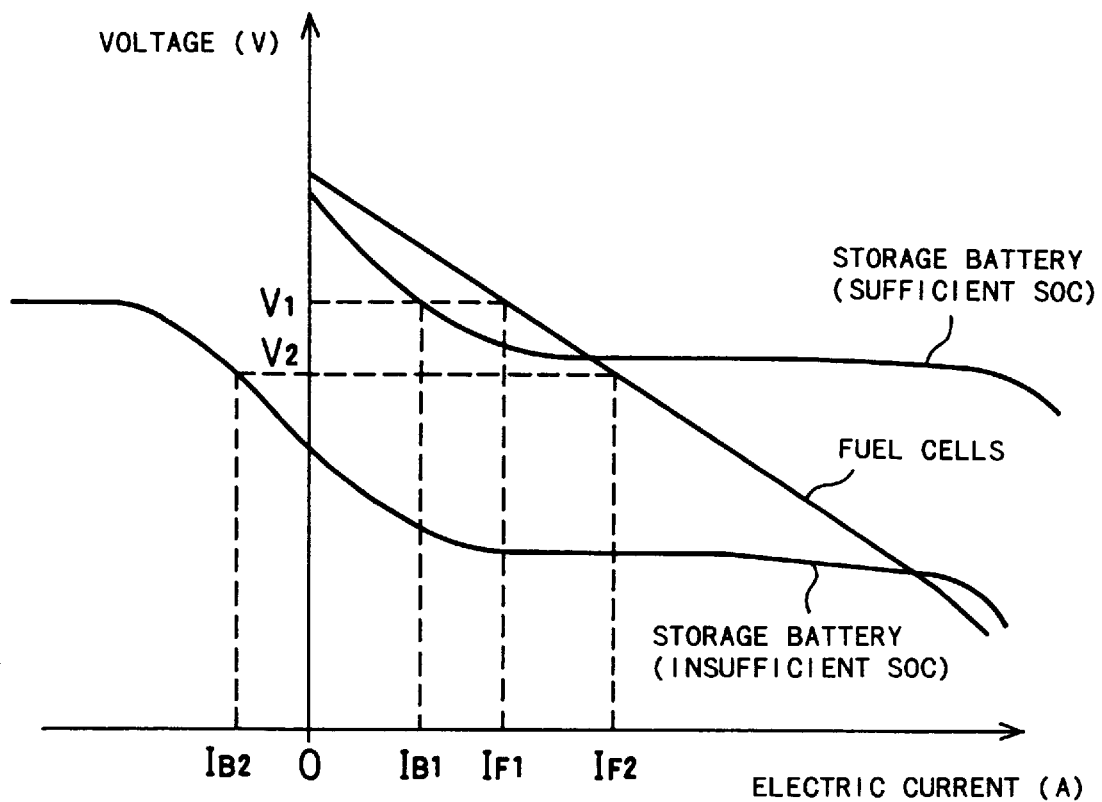
FIG. 4 is a graph showing output characteristics of the fuel cells 20 and a storage battery 30 in the sufficient charge state and in the insufficient charge state.

FIG. 4 is a graph showing output characteristics of the fuel cells 20 and the storage battery 30. The fuel cells 20 give large output voltages under the condition of small loading, that is, under the condition of little output current, and decrease the voltage with an increase in electric current. The storage battery 30 can keep the voltage within a predetermined narrow range against a wide range of electric current, but varies the voltage according to the charge state thereof. FIG. 4 shows the output characteristics of the storage battery 30 both in the sufficient charge state and in the insufficient charge state.

In case that the power supply system 10 starts in the sufficient charge state of the storage battery 30, both the fuel cells 20 and the storage battery 30 output the electric power to the auxiliary machinery 34. Here It1 represents the overall electric current required to drive the auxiliary machinery 34. Under such conditions, the electric current is taken out of the fuel cells 20 and the storage battery 30. Since the fuel cells 20, the storage battery 30, and the auxiliary machinery 34 are connected parallel to one another, they have an identical end-to-end voltage, which is expressed as V1. Based on the graph of FIG. 4, output electric current IF1 of the fuel cells 20 and output electric current IB1 of the storage battery 30 satisfy the equation of It1=IF1+IB1.

In case that the power supply system 10 starts in the insufficient charge state of the storage battery 30, on the other hand, the fuel cells 20 supply the electric power to the auxiliary machinery 34 while charging the storage battery 30. In this state, the overall electric current required to drive the auxiliary machinery 34 is unchanged and fixed to It1, and the fuel cells 20, the storage battery 30, and the auxiliary machinery 34 still have an identical end-to-end voltage, which is expressed as V2. Based on the graph of FIG. 4, output electric current IF2 of the fuel cells 20 and output electric current IB2 of the storage battery 30 satisfy the equation of It1=IF2 +IB2, where IB2<0.

At a start of the power supply system 10, the storage battery 30 is either charged or discharged according to its charge state. In case that the storage battery 30 is in the sufficient charge state, the auxiliary machinery 34 is driven by both the fuel cells 20 and the storage battery 30. In case that the storage battery 30 is in the insufficient charge state, on the contrary, the fuel cells 20 are required to supply the electric power not only to drive the auxiliary machinery 34 but also to charge the storage battery 30. While the electric power required to drive the auxiliary machinery 34 is kept in a predetermined range, the output state of the fuel cells 20 is significantly varied by the charge state of the storage battery 30 at the time of starting the power supply system 10.

At the time of starting the power supply system 10, the structure of the embodiment detects the charge state of the storage battery 30, determines the operating conditions of the fuel cells 20 according to the detected charge state of the storage battery 30, and precisely regulates the flows of gases supplied to the fuel cells 20. The control of the operating conditions of the fuel cells 20 carried out at a start of the power supply system 10 follows a start-time processing routine shown in the flowchart of FIG. 5. The CPU 52 executes the routine when the predetermined start switch included in the starter unit 40 is turned off in the vehicle with the power supply system 10 mounted thereon.

Figure 5:
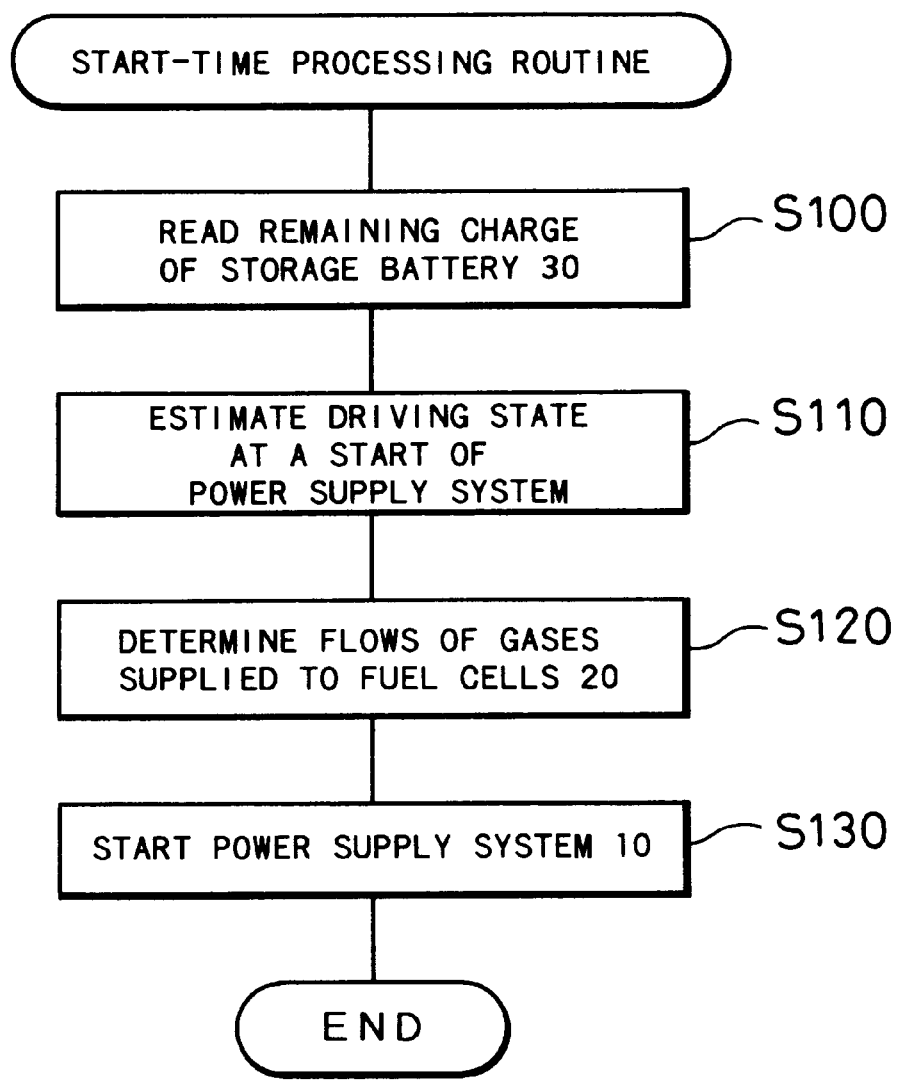
FIG. 5 is a flowchart showing a start-time processing routine executed at the time of starting the power supply system 10 in the first embodiment.

When the program enters the routine of FIG. 5, the CPU 52 first reads the remaining charge of the storage battery 30 detected by the remaining charge monitor 42 at step S100. The power supply system 10 of the embodiment includes an SOC meter as the remaining charge monitor 42. The SOC meter determines the current remaining charge of the storage battery 30, based on the past data regarding charge and discharge conditions of the storage battery 30.

At subsequent step S110, the CPU 52 predicts the driving state at a start of the power supply system 10, based on the remaining charge of the storage battery 30 input at step S100. The driving state at a start of the power supply system 10 depends upon the remaining charge of the storage battery 30. In case that the remaining charge of the storage battery 30 is less than a predetermined level, the fuel cells 20 supply electric power to the auxiliary machinery 34 as well as to the storage battery 30, in order to charge the storage battery 30. In case that the remaining charge of the storage battery is not less than the predetermined level, on the other hand, both the fuel cells 20 and the storage battery 30 supply electric power to the auxiliary machinery 34 at a start of the power supply system 10.

Most of the auxiliary machinery 34 driven at the time of starting the power supply system 10 is concerned with operation of the fuel cells 20. The electric power required to drive the auxiliary machinery 34 is kept in a predetermined range. As discussed previously with the graph of FIG. 4, the CPU 52 estimates the output electric currents of the fuel cells 20 and the storage battery 30, based on the known total loading (overall electric current required to drive the auxiliary machinery 34) and the remaining charge of the storage battery 30 (output characteristics according to the remaining charge). In case that the remaining charge of the storage battery 30 is less than the predetermined level, the fuel cells 20 are required to supply the electric power not only to the auxiliary machinery 34 but to the storage battery 30 and thereby have a higher estimate of output electric current. In case that the remaining charge of the storage battery 30 is not less than the predetermined level, on the contrary, both the fuel cells 20 and the storage battery 30 output the electric power to the auxiliary machinery 34 and the fuel cells 20 accordingly have a lower estimate of output electric current.

The program then proceeds to step S120 to determine the amounts of gases which the fuel cells 20 require to carry out power generation according to the predicted driving state (that is, the estimated output electric current of the fuel cells 20) at a start of the power supply system 10. The fuel cells 20 produce an electromotive force through the electrochemical reactions. Supply of sufficient amounts of gases, which correspond to the amount of the connected loading, to both the anodes and the cathodes enables the fuel cells 20 to output the required amount of electric power. The relationship between the amounts of gas supplies and the amount of power generation is stored in advance in the control unit 50. This enables the required amounts of gases to be readily determined according to the output electric current of the fuel cells 20 estimated at step S110. The actual procedure obtains the theoretically required amounts of gases multiplied by a predetermined excess rate. Before a start of the power supply system 10, the internal temperature of the fuel cells 20 is lower than a predetermined operating temperature. Power generation by the fuel cells 20 based on the electrochemical reactions is affected by the temperature. A preferable procedure accordingly measures the internal temperature of the fuel cells 20 and corrects the required amounts of gases supplied to the fuel cells 20 based on the observed temperature.

After determining the required amounts of gases supplied to the fuel cells 20, the program proceeds to step S130 to start the power supply system 10 under the determined conditions. The program then exits from this routine. At the time of starting the power supply system 10, the control unit 50 outputs driving signals to the respective constituents of the fuel-cells unit 60 in order to enable supply of the determined flows of gases to the fuel cells 20, while outputting a signal to the relay 38 to connect the circuit and start a supply of electric power to the auxiliary machinery 34.

At a start of the power supply system 10, the structure of the embodiment detects the remaining charge of the storage battery 30, estimates the intensity of output electric current of the fuel cells 20 based on the result of detection, supplies the required amounts of gases corresponding to the estimated amount of electric current to the fuel cells 20, and connects the loading to the fuel cells 20. When the power supply system 10 starts, this structure prevents the fuel cells 20 from being exposed to the unexpectedly large loading due to the insufficient remaining charge of the storage battery 30. The excess loading causes the fuel cells 20 to receive only the insufficient amounts of gases, which may lead to troubles, such as a voltage drop, a change of poles, and a partial heat emission. In case that the storage battery 30 has a sufficient remaining charge at the time of starting the power supply system 10, both the fuel cells 20 and the storage battery 30 supply electric power. In this case, the fuel cells 20 are required to output a less amount of electric power. The structure of the embodiment effectively prevents the excess amounts of gases from being wastefully supplied to the fuel cells 20. This structure also prevents excess flows of gases from being supplied to the fuel cells 20 in order to provide against the probable insufficient remaining charge of the storage battery 30 at a start of the power supply system 10.

The structure of the embodiment that estimates the required amounts of gases at a start of the power supply system 10 and supplies just the required amounts of gases to the fuel cells 20 exerts the following effects. The gaseous fuel supplied to the cathodes of the fuel cells 20 is prepared by reforming methanol previously mounted on the electric vehicle 15 with the power supply system 10. Wasteful consumption of gaseous fuel results in wastefully consuming methanol. The possible driving distance of the electric vehicle depends upon the amount of methanol mounted on the electric vehicle. Such wasteful consumption of methanol accordingly results in shortening the possible driving distance of the electric vehicle by each supply of fuel. The power supply system 10 of the embodiment prevents the fuel from being wastefully consumed to shorten the possible driving distance of the electric vehicle 15 at the time of starting the power supply system 10.

The air is taken in as the oxidizing gas and supplied to the anodes of the fuel cells 20. In this case, wasteful consumption of the air leads to a waste of electric power used for feeding the air to the fuel cells 20. As discussed above, the air (oxidizing gas) is pressurized by the air compressor 66 before being supplied to the anodes. The electric power required for driving the air compressor 66 is supplied by the fuel cells 20 and the storage battery 30. An excess supply of oxidizing gas thus results in a waste of electric power consumed to drive the air compressor 66. The power supply system 10 of the embodiment supplies just the required amount of oxidizing gas corresponding to the predicted driving state to the fuel cells 20, thereby preventing the excess amount of electric power from being wastefully consumed to drive the air compressor 66.

The first embodiment checks the remaining charge of the storage battery 30 and determines the required amounts of gases supplied to the fuel cells 20 based on the remaining charge of the storage battery 30, prior to a start of the power supply system 10. The control of the gas supplies based on the remaining charge of the fuel cells 30 is also preferably carried out during operation of the power supply system 10. The following describes regulation of the amounts of gases supplied to the fuel cells 20 during operation of the power supply system 10 as a second embodiment. Like the first embodiment, the second embodiment regards the power supply system 10 mounted on the electric vehicle 15. The structure of the power supply system 10 is thus not specifically described here.

During the operation of the power supply system 10, the charge and discharge state of the storage battery 30 is varied according to the amount of the loading or more concretely, according to the driving amount of the motor 32 mounted on the electric vehicle 15. Since the fuel cells 20 and the storage battery 30 are connected parallel to each other, an increase in driving amount of the motor 32 causes both the fuel cells 20 and the storage battery 30 to supply electric power to the loading. Under such conditions, the storage battery 30 discharges electric power, so that the remaining charge of the storage battery 30 decreases. A decrease in driving amount of the motor 32, on the contrary, causes the fuel cells 20 to supply electric power not only to the motor 32 but to the storage battery 30. Under such conditions, the storage battery 30 is charged with the supplied electric power, so that the remaining charge of the storage battery 30 is recovered.

An increase in loading, for example, when the vehicle goes up a slope, increases the outputs from both the fuel cells 20 and the storage battery 30 and thereby decreases the remaining charge of the storage battery 30. Under the condition that the storage battery 30 has the decreased remaining charge, in case that the amounts of gases supplied to the fuel cells 20 are decreased with a decrease in loading, shortage in gases may arise in the fuel cells 20. When the loading decreases to or below a predetermined level, the fuel cells 30 starts supplying the electric power to the storage battery 30 as well as to the loading. The required amounts of gases should accordingly correspond to the electric power supplied to both the loading and the storage battery 30. The power supply system 10 of the second embodiment measures the charge state of the storage battery 30 and the amount of the loading at predetermined time intervals and regulates the amounts of gases supplied to the fuel cells 20 according to the results of measurement. Regulation of the gas supplies to the fuel cells 20 follows an in-operation processing routine shown in the flowchart of FIG. 6. This routine is executed by the CPU 52 at predetermined time intervals, for example, at every 1 sec, after the start of the power supply system 10.

Figure 6:
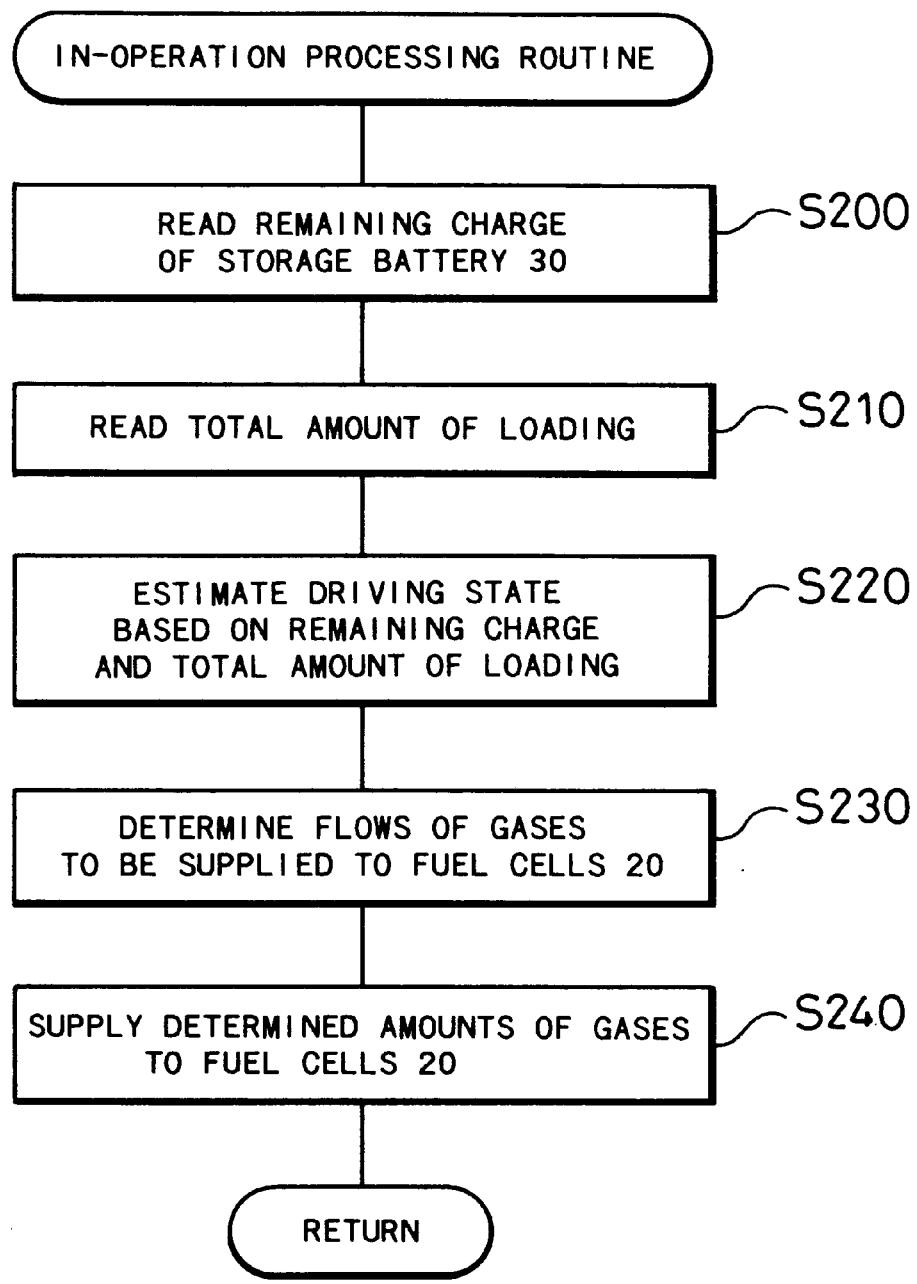
FIG. 6 is a flowchart showing an in-operation processing routine executed during operation of the power supply system 10 as a second embodiment according to the present invention.

When the program enters the routine of FIG. 6, the CPU 52 first reads the remaining charge of the storage battery 30 detected by the remaining charge monitor 42 at step S200. Like the first embodiment, the power supply system 10 of the second embodiment includes an SOC meter as the remaining charge monitor 42. The SOC meter determines the current remaining charge of the storage battery 30, based on the past data regarding charge and discharge conditions of the storage battery 30.

The CPU 52 then reads the total amount of loading that receives a supply of electric power from the power supply system 10 at step S210. A concrete procedure measures the electric power consumed by the motor 32 and the auxiliary machinery 34. The respective constituents of the auxiliary machinery 34 consume a substantially fixed amount of electric power during operation. All the electric power consumed can thus be calculated based on the information relating to the devices currently in operation. As discussed above, the fuel cells 20 regard the storage battery 30 as the loading, while the storage battery 30 is charged. As a matter of convenience, however, the loading regards only the motor 32 and the auxiliary machinery 34.

After reading the data regarding the remaining charge of the storage battery 30 and the total amount of loading, the CPU 52 estimates the outputs of the fuel cells 20 and the storage battery 30 at step S220. The outputs of the fuel cells 20 and the storage battery 30 depend upon the remaining charge of the storage battery 30 and the total amount of loading. In case that the remaining charge of the storage battery 30 is not greater than a predetermined level and the total amount of loading is relatively small, the fuel cells 20 supply the electric power to the storage battery 30 as well as to the connected loading. The estimated output electric current of the fuel cells 20 accordingly becomes higher than the total amount of loading. At this moment, the storage battery 30 functions as the loading against the fuel cells 20. In case that the remaining charge of the storage battery 30 is greater than the predetermined level, on the other hand, the storage battery 30 as well as the fuel cells 30 supply the electric power to the loading. The estimated output electric current of the fuel cells 20 accordingly becomes lower than the total amount of loading.

The program then proceeds to step S230 to determine the amounts of gases which the fuel cells 20 require to carry out power generation according to the predicted driving state (that is, the estimated output electric current of the fuel cells 20). The fuel cells 20 produce an electromotive force through the electrochemical reactions. Supply of sufficient amounts of gases, which correspond to the amount of the connected loading, to both the anodes and the cathodes enables the fuel cells 20 to output the required amount of electric power. The relationship between the amounts of gas supplies and the amount of power generation is stored in advance in the control unit 50. This enables the required amounts of gases to be readily determined according to the output electric current of the fuel cells 20 estimated at step S220. The actual procedure obtains the theoretically required amounts of gases multiplied by a predetermined excess rate.

After determining the required amounts of gases supplied to the fuel cells 20, the program proceeds to step S240 to actually regulate the flows of gases according to the determined conditions. The program then exits from this routine. In accordance with a concrete procedure, the control unit 50 outputs driving signals to the respective constituents of the fuel cells-unit 60, in order to correct the amounts of gases supplied to the fuel cells 20 to the predetermined levels.

The power supply system 10 of the second embodiment reads the remaining charge of the storage battery 30 and the amount of the connected loading at predetermined time intervals during operation of the power supply system 10, estimates the output electric current of the fuel cells 20 based on the input data, and regulates the amounts of gases supplied to the fuel cells 20 corresponding to the estimated output electric current. Even when an abrupt increase in amount of loading lowers the remaining charge of the storage battery 30 and changes the state of the storage battery 30 from the discharging condition to the charging condition, the structure of the embodiment effectively prevents shortage of gases in the fuel cells 20, which may cause troubles, such as a voltage drop and a partial heat emission.

In case that the storage battery 30 has a sufficient remaining, on the other hand, both the fuel cells 20 and the storage battery 30 supply electric power. In this case, the fuel cells 20 are required to output a less amount of electric power. The structure of the embodiment effectively prevents the excess amounts of gases from being wastefully supplied to the fuel cells 20. This structure also prevents excess flows of gases from being supplied to the fuel cells 20 in order to provide for the change of the state of the storage battery 30 to the charging condition.

The structure of the second embodiment continuously keeps the amounts of gases supplied to the fuel cells 20 to the optimum levels during operation of the power supply system 10. Another possible procedure determines the amounts of gases supplied to the fuel cells 20, in principle, according to the amount of the connected loading. Only when the storage battery 30 is being charged and there is a fear of shortage of gases in the fuel cells 20, this structure corrects the amounts of gases supplied to the fuel cells 20 according to the remaining charge of the storage battery 30. This structure is described below as a third embodiment according to the present invention. Like the first and the second embodiments, the third embodiment regards the power supply system 10 mounted on the electric vehicle 15. The structure of the power supply system 10 is thus not specifically described here.

Figure 7:
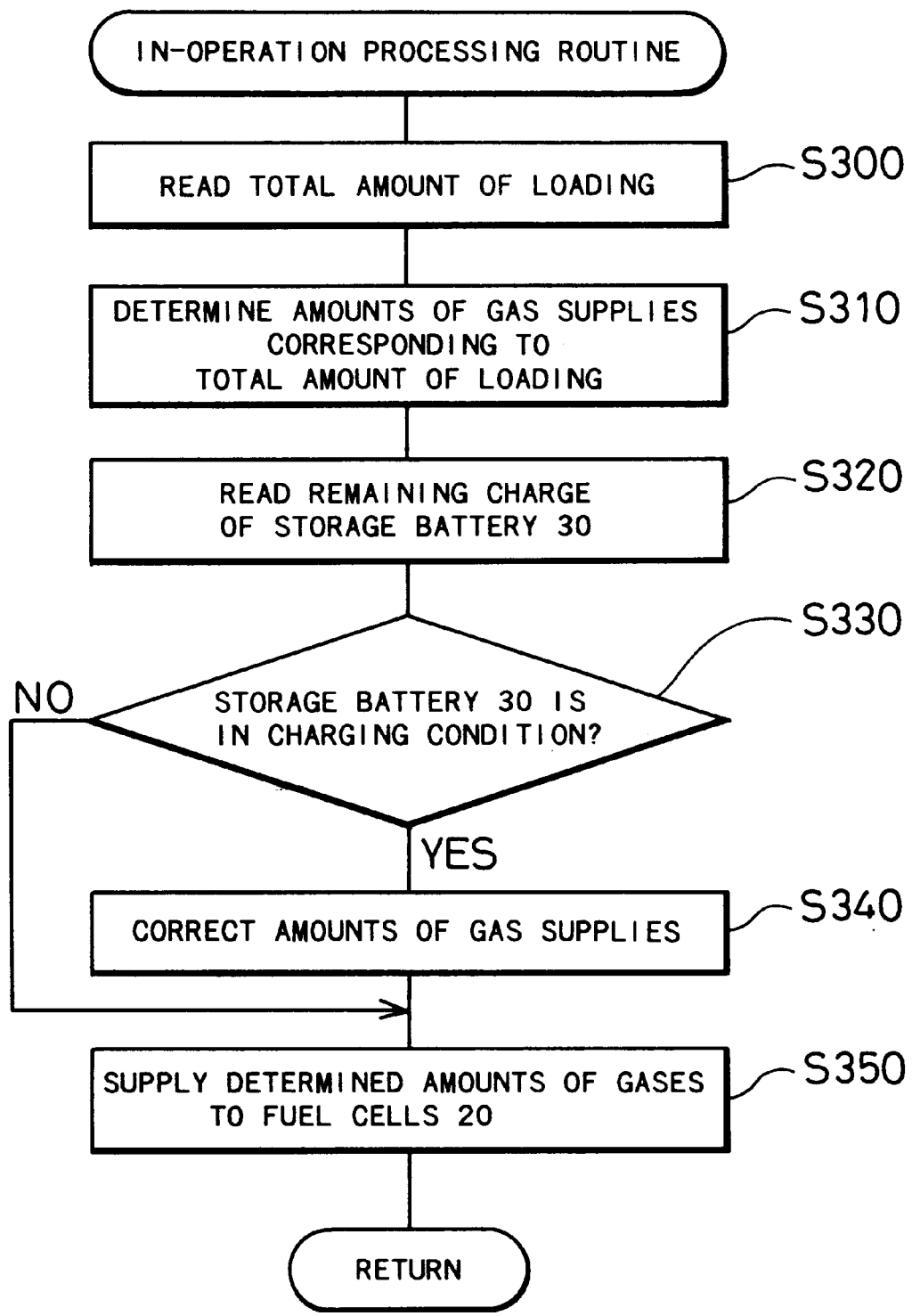
FIG. 7 is a flowchart showing another in-operation processing routine executed during operation of the power supply system 10 as a third embodiment according to the present invention.

In the power supply system 10 of the third embodiment, regulation of the gas supplies to the fuel cells 20 follows an in-operation processing routine shown in the flowchart of FIG. 7. This routine is executed by the CPU 52 at predetermined time intervals, for example, at every 1 sec, after the start of the power supply system 10. When the program enters the routine of FIG. 7, the CPU 52 first reads the total amount of loading that receives a supply of electric power from the power supply system 10 at step S300. A concrete procedure measures the electric power consumed by the motor 32 and the auxiliary machinery 34. The respective constituents of the auxiliary machinery 34 consume a substantially fixed amount of electric power during operation. All the electric power consumed can thus be calculated based on the information relating to the devices currently in operation.

The CPU 52 then determines the amounts of gases to be supplied to the fuel cells 20, based on the input data regarding the total amount of loading at step S310. A concrete procedure estimates the output electric current of the fuel cells 20 based on a variation in total amount of loading that is the sum of the motor 32 and the auxiliary machinery 34, and subsequently determines the amounts of gases to be supplied to the fuel cells 20 based on the estimated output electric current.

The CPU 52 subsequently reads the remaining charge of the storage battery 30 detected by the remaining charge monitor 42 at step S320. Like the first and the second embodiments, the power supply system 10 of the third embodiment includes an SOC meter as the remaining charge monitor 42. The SOC meter determines the current remaining charge of the storage battery 30, based on the past data regarding charge and discharge conditions of the storage battery 30.

The program then proceeds to step S330 to determine the charge and discharge state of the storage battery 30 based on the remaining charge of the storage battery 30 read at step S320 and the total amount of loading read at step S300. In case that the storage battery 30 is determined to be in the charging condition, the CPU 52 calculates the total amount of electric power, which the fuel cells 20 are expected to supply, by taking into account the amount of electric power required for charging the storage battery 30 and corrects the amounts of gases, which has been determined at step S310, to be supplied to the fuel cells 20 at step S340. At subsequent step S350, the control unit 50 outputs driving signals to the respective constituents of the fuel-cells unit 60 and supplies the amounts of gases corrected at step S340 to the fuel cells 20. The program then exits from this routine.

In case that the storage battery 30 is determined to be in the discharging condition at step S330, that is, when it is expected that both the fuel cells 20 and the storage battery 30 supply the electric power to the loading, the control unit 50 outputs driving signals to the respective constituents of the fuel-cells unit 60 and supplies the amounts of gases determined at step S310 to the fuel cells 20 at step S350. The program then exits from this routine.

While the storage battery 30 is being charged, like the second embodiment, the power supply system 10 of the third embodiment corrects the amounts of gases supplied to the fuel cells 20. This structure effectively prevents a supply of electric power to the storage battery 30 from causing shortage of gases in the fuel cells 20, which may lead to troubles, such as a voltage drop and a partial heat emission.

In all of the above embodiments, the power supply system of the present invention is mounted on a vehicle and used as a power source for driving the vehicle. The loading, to which the power supply system of the present invention is connected and supplies electric power, is, however, not restricted to the motor for driving the vehicle. The structure ensures the sufficient amounts of gases supplied to the fuel cells at a start or during operation of the power supply system, thereby exerting the same effects as those of the above embodiments. This structure supplies the required amounts of gases to the fuel cells according to the amount of the connected loading and the remaining charge of the storage battery, thus protecting the fuel cells from troubles, such as a voltage drop and a partial heat emission.

The present invention is not restricted to the above embodiments or their modified examples, but there may be many other modifications, changes, and alterations without departing from the scope or spirit of the main characteristics of the present invention.

It should be clearly understood that the above embodiments are only illustrative and not restrictive in any sense. The scope and spirit of the present invention are limited only by the terms of the appended claims.

What is claimed is:

1. A power supply system comprising a stack of fuel cells and a storage battery, which are connected parallel to each other and also to a loading, wherein said stack of fuel cells and said storage battery supply electric power to said loading, said power supply system comprising:

remaining charge detection means for detecting a remaining charge of said storage battery;

amount-of-loading detection means for detecting a total amount of said loading;

charge-discharge state estimation means for estimating a charge-discharge state of said storage battery, based on the results of detection by said remaining charge detection means and said amount-of-loading detection means;

amount-of-fuel supply determination means for determining a required amount of a fuel for power generation in said stack of fuel cells, based on the charge-discharge state of said storage battery estimated by said charge-discharge state estimation means; and fuel supply means for supplying the required amount of said fuel determined by said amount-of-fuel supply determination means to said stack of fuel cells.

2. A power supply system comprising a stack of fuel cells and a storage battery, which are connected parallel to each other and also to a loading, wherein said stack of fuel cells and said storage battery supply electric power to said loading, said power supply system comprising:

remaining charge detection means for detecting a remaining charge of said storage battery;

charge-discharge state estimation means for, at the time of starting said power supply system, estimating a charge-discharge state of said storage battery, based on a predetermined amount of loading, which represents electric power consumed by machinery driven at the time of starting said power supply system, out of said loading and the result of detection by said remaining charge detection means;

amount-of-fuel supply determination means for, at least when said storage battery is in a charging condition, determining a required amount of a fuel for power generation in said stack of fuel cells, based on the charge-discharge state of said storage battery estimated by said charge-discharge state estimation means; and fuel supply means for supplying the required amount of said fuel determined by said amount-of-fuel supply determination means to said stack of fuel cells.

3. An electric vehicle having a motor rotated by electrical energy and means for transmitting a rotational force of said motor to an axle, thereby producing a driving force for said vehicle, said electric vehicle having a power supply system mounted thereon, said power supply system comprising a stack of fuel cells and a storage battery, which are connected parallel to each other and also to a loading comprising said motor, wherein said stack of fuel cells and said storage battery supply electric power to said loading, said power supply system comprising:

remaining charge detection means for detecting a remaining charge of said storage battery;

amount-of-loading detection means for detecting a total amount of said loading;

charge-discharge state estimation means for estimating a charge-discharge state of said storage battery, based on the results of detection by said remaining charge detection means and said amount-of-loading detection means;

amount-of-fuel supply determination means for determining a required amount of a fuel for power generation in said stack of fuel cells, based on the charge-discharge state of said storage battery estimated by said charge-discharge state estimation means; and fuel supply means for supplying the required amount of said fuel determined by said amount-of-fuel supply determination means to said stack of fuel cells.

4. An electric vehicle having a motor rotated by electrical energy and means for transmitting a rotational force of said motor to an axle, thereby producing a driving force for said vehicle, said electric vehicle having a power supply system mounted thereon, said power supply system comprising a stack of fuel cells and a storage battery, which are connected parallel to each other and also to a loading comprising said motor, wherein said stack of fuel cells and said storage battery supply electric power to said loading, said power supply system comprising:

remaining charge detection means for detecting a remaining charge of said storage battery;

charge-discharge state estimation means for, at the time of starting said power supply system, estimating a charge-discharge state of said storage battery, based on a predetermined amount of loading, which represents electric power consumed by machinery driven at the time of starting said power supply system, out of said loading and the result of detection by said remaining charge detection means;

amount-of-fuel supply determination means for, at least when said storage battery is in a charging condition, determining a required amount of a fuel for power generation in said stack of fuel cells, based on the charge-discharge state of said storage battery estimated by said charge-discharge state estimation means; and fuel supply means for supplying the required amount of said fuel determined by said amount-of-fuel supply determination means to said stack of fuel cells.

5. In a power supply system comprising a stack of fuel cells and a storage battery, which are connected parallel to each other and also to a loading, wherein said stack of fuel cells and said storage battery supply electric power to said loading, a method of regulating an amount of a fuel supplied to said stack of fuel cells for power generation in said stack of fuel cells, said method comprising the steps of:

(a) detecting a remaining charge of said storage battery;

(b) detecting a total amount of said loading;

(c) estimating a charge-discharge state of said storage battery, based on the remaining charge detected in said step (a) and the total amount of said loading detected in said step (b);

(d) determining a required amount of said fuel for power generation in said stack of fuel cells, based on the charge-discharge state of said storage battery estimated in said step (c); and (e) supplying the required amount of said fuel determined in said step (d) to said stack of fuel cells.

6. In a power supply system comprising a stack of fuel cells and a storage battery, which are connected parallel to each other and also to a loading, wherein said stack of fuel cells and said storage battery supply electric power to said loading, a method of regulating an amount of a fuel supplied to said stack of fuel cells for power generation in said stack of fuel cells, said method comprising the steps of:

(a) detecting a remaining charge of said storage battery;

(b) at the time of starting said power supply system, estimating a charge-discharge state of said storage battery, based on a predetermined amount of loading, which represents electric power consumed by machinery driven at the time of starting said power supply system, out of said loading and the remaining charge detected in said step (a);

(c) at least when said storage battery is in a charging condition, determining a required amount of said fuel for power generation in said stack of fuel cells, based on the charge-discharge state of said storage battery estimated in said step (b); and (d) supplying the required amount of said fuel determined in said step (c) to said stack of fuel cells.

* * * * *